United States Patent [19]

Blytas

[11] 4,414,194

[45] Nov. 8, 1983

[54] EXTRACTION PROCESS

[75] Inventor: George C. Blytas, Houston, Tex.

[73] Assignee: Shell Oil Company, Houston, Tex.

[21] Appl. No.: 362,337

[22] Filed: Mar. 26, 1982

Related U.S. Application Data

[63] Continuation-in-part of Ser. No. 267,202, May 26, 1981, abandoned.

[51] Int. Cl.³ .................... C01B 17/04; B01D 53/34
[52] U.S. Cl. .............................. 423/573 G; 423/224; 423/226
[58] Field of Search ............... 423/224, 226, 573, 575, 423/222, 578 R

[56] References Cited

U.S. PATENT DOCUMENTS

| | | | |
|---|---|---|---|
| 3,068,065 | 12/1962 | Hartley et al. | 423/228 |
| 3,099,536 | 7/1963 | Urban et al. | 423/575 |
| 3,580,950 | 5/1971 | Bersworth | 562/565 |
| 3,933,993 | 1/1976 | Salemme | 423/226 |
| 4,009,251 | 2/1977 | Meuly | 423/573 |
| 4,091,073 | 5/1978 | Winkler | 423/226 |
| 4,243,648 | 1/1981 | Fenton | 423/573 |

Primary Examiner—Earl C. Thomas
Attorney, Agent, or Firm—Albert J. Adamcik

[57] ABSTRACT

A cyclic process for the removal of $H_2S$ from gas stream is disclosed, the process being characterized by reaction of the $H_2S$ to sulfur employing specific aqueous solution reactants, and by recovery of the sulfur employing specific extractants.

13 Claims, 1 Drawing Figure

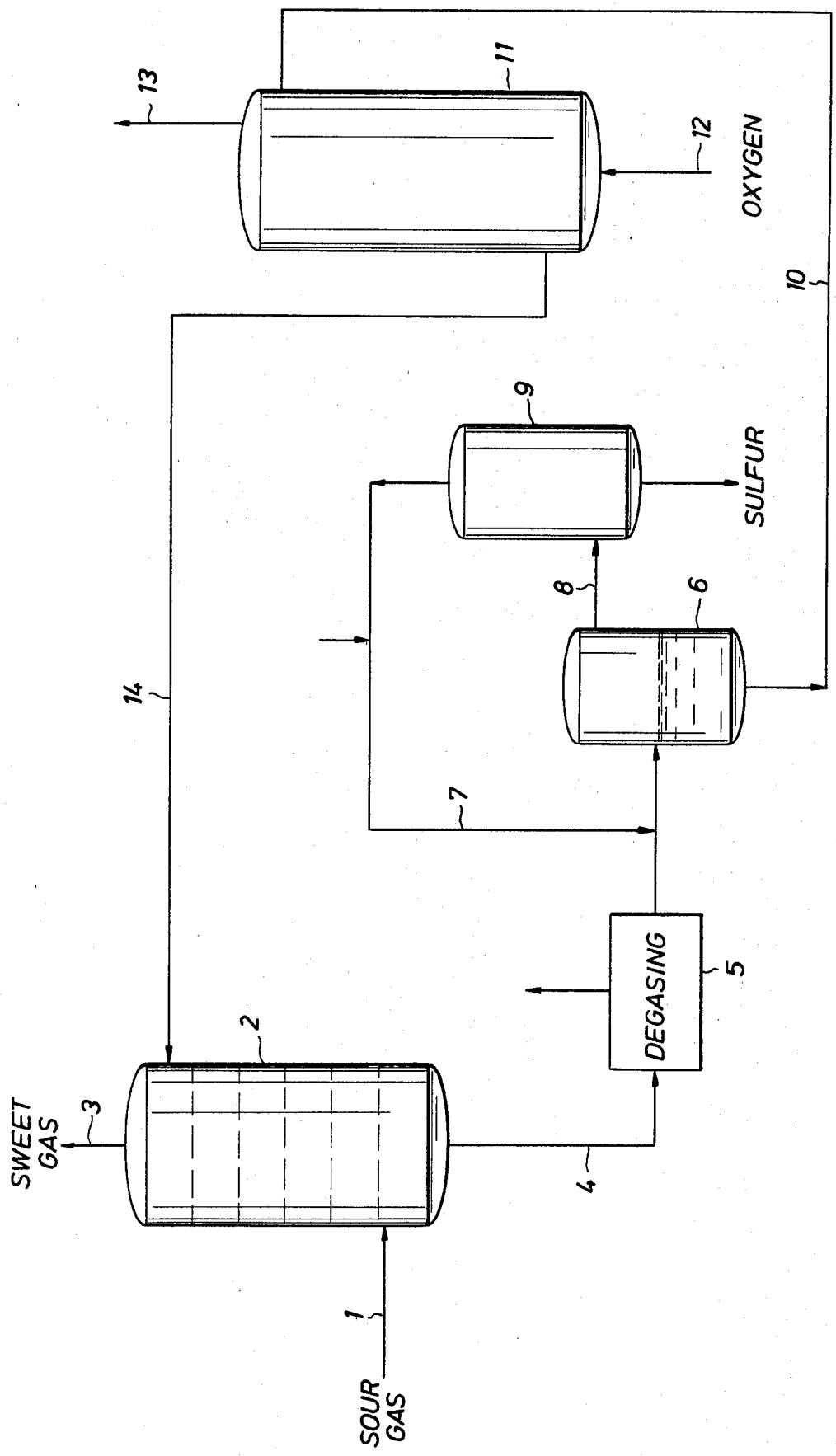

EXTRACTION PROCESS

BACKGROUND OF THE INVENTION

This application is a continuation-in-part of my co-pending application Ser. No. 267,202, entitled Extraction Process, filed May 26, 1981, and now abandoned.

The presence of significant quantities of $H_2S$ and $CO_2$ in various "sour" industrial gaseous streams poses a persistant problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

In yet another process, e.g., that disclosed in U.S. Pat. No. 4,091,073, issued May 23, 1978, to Winkler, $CO_2$ present in the gaseous stream is also removed by use of a suitable selective absorbent.

A problem associated with such processes is that the solid sulfur produced is of poor quality, i.e., it is very finely divided and difficult to separate from the aqueous reactant solution. A process which provided for the efficient reaction of $H_2S$ and removal of the sulfur produced could have great economic importance.

SUMMARY OF THE INVENTION

Accordingly, the invention relates to a process for the removal of $H_2S$ from a sour gaseous stream comprising contacting the sour gaseous stream in a contacting zone with an aqueous reactant mixture, the aqueous reactant mixture comprising an effective amount of a reactant selected from the group consisting of polyvalent metal ions, polyvalent metal chelate compounds, and mixtures thereof. A sweet gas stream is produced, and an aqueous admixture containing sulfur and a reduced reactant is removed from the contact zone. The invention provides that the aqueous admixture is contacted with a liquid composition selected from compounds having the formula $C_nH_{2n+1}OH$, wherein n is a whole number from 4 through 15, and mixtures thereof, in an extraction zone in an amount sufficient to remove at least the bulk of the sulfur from the aqueous admixture and form a separate liquid phase containing sulfur and the compound. Accordingly, the invention provides for the formation of a three-phase mass containing, in the upper phase, solid sulfur and the liquid compound or compounds mentioned, and a lower phase, in contact therewith, containing the aqueous admixture. It has been found, surprisingly, the compounds or compositions described exhibit the ability to extract the sulfur from the aqueous admixture. The upper liquid phase, or a portion thereof, may then be removed, preferably continuously, and the sulfur recovered, e.g., by heating the solution and melting the sulfur to effect a separation. Concomitantly the lower phase, or a portion thereof, may then be separated, again preferably continuously, and the reactant therein regenerated by contacting the admixture in a regeneration zone or zones with oxygen. As used herein, the term "oxygen" includes oxygen-containing gases, air or air-enriched with oxygen. The oxygen oxidizes the reduced metal ions or the metal of the chelate or chelates to a higher valence state, and the regenerated mixture is returned to the contact zone. The oxygen (in whatever form supplied) is supplied in a stoichiometric equivalent or excess with respect to the amount of reactant present in the mixture. Preferably, the oxygen-containing gas is supplied in an amount of from about 20% to 200% stoichiometric excess.

The particular type of gaseous stream treated is not critical, as will be evident to those skilled in the art. Streams particularly suited to removal of $H_2S$ by the practice of the invention are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing sufficient quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. Obviously, the amount of $H_2S$ present is not generally a limiting factor in the practice of the invention.

The temperatures employed in the contacting zone are not generally critical, except that the reaction is carried out at a temperatures below the melting point of sulfur. In many commercial applications, such as the removal of $H_2S$ from natural gas to meet pipeline specifications, contacting at ambient temperatures is desired, since the cost of refrigeration would exceed the benefits obtained due to increased absorption at the lower temperature. In general, temperatures of from 10° C. to 80° C. are suitable, and temperatures from 20° C. to 45° C. are preferred. Contact times may range from about 1 second to about 270 seconds or longer, with contact times of 2 seconds to 120 seconds being preferred. Temperatures employed in the extraction zone will approximate those in the contacting zone, except that they will always be below the melting point of sulfur.

Similarly, in the regeneration or stripping zone or zones, temperatures may be varied widely. Preferably, the regeneration zone should be maintained at substantially the same temperature as the absorption zone. If heat is added to assist regeneration, cooling of the absorbent mixture is required before return of the absorbent mixture to the absorption zone. In general, temperatures of from about 10° C. to 80° C., preferably 20° C. to 45° C. may be employed.

Pressure conditions in the absorption zone may vary widely, depending on the pressure of the gas to be treated. For example, pressures in the absorption zone may vary from one atmosphere up to one hundred fifty or even two hundred atmospheres. Pressures of from one atmosphere to about one hundred atmospheres are preferred. In the regeneration or desorption zone or zones, pressures may be varied considerably, and will preferably range from about 0.5 atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251, to Meuly, issued Feb. 22, 1977, which disclosures are incorporated herein by reference. Preferably, if the iron chelate of nitrilotriacetic acid is used, pH in the process of the invention will range from about 6 to about 7.5, and the molar ratio of the nitrilotriacetic acid to the iron is from about 1.2 to 1.4. The procedure is preferably conducted continuously.

As indicated, the $H_2S$, when contacted, is quickly converted by the polyvalent metal ions, polyvalent metal chelate, etc., to elemental sulfur. The amount of polyvalent metal compound, polyvalent metal chelate, or mixtures thereof, supplied is an effective amount, i.e., an amount sufficient to convert all or substantially all of the $H_2S$ in the gas stream, and will generally be on the order of at least about one mol per mol of $H_2S$. Ratios of from about 1 or 2 mol to about 15 mols of polyvalent metal compound or chelate per mol of $H_2S$ may be used, with ratios of from about 2 mols per mol to about 5 mols of polyvalent metal compound or chelate per mol of $H_2S$ being preferred. The manner of preparing the aqueous solution or admixture is a matter of choice. The polyvalent metal ion or polyvalent metal chelate solution will generally be supplied as an aqueous solution having a concentration of from about 0.1 molar to about 2 molar, and a concentration of about 0.6 to 0.8 molar is preferred.

Any polyvalent metal can be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin. The metals are normally supplied as a salt, oxide, hydroxide, etc.

Preferred reactant materials are coordination complexes in which polyvalent metals from chelates with an acid having the formula

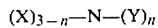

wherein n is a whole number from 1 to 3; Y is an acetic acid or propionic acid group; X is 2-hydroxy ethyl, 2-hydroxy propyl, or an alkyl group having from one to four carbon atoms; or

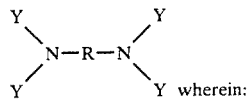

wherein:
from two to four of the groups Y are selected from acetic and propionic acid groups;
from zero to two of the groups Y are selected from 2-hydroxy ethyl and 2-hydroxy propyl, and R is ethylene, propylene or isopropylene or alternatively cyclohexane or benzene where the two hydrogen atoms replaced by nitrogen are in the 1,2 position; and mixtures thereof.

The polyvalent metal chelates are readily formed in aqueous solution by reaction of an appropriate salt, oxide or hydroxide of the polyvalent metal and the chelating agent in the acid form or an alkali metal or ammonium salt thereof. Exemplary chelating agents include amino acetic acids derived from ammonia or 2-hydroxy alkyl amines, such as glycine, diglycine (imino diacetic acid), NTA (nitrilo triacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950. The iron chelates of NTA and 2-hydroxyethyl ethylene diamine triacetic acid are preferred.

As indicated, compounds having the formula $C_nH_{2n+1}OH$, in which n is a whole number from 4 through 15 (preferably 10 through 14), and mixtures thereof, may be used in extracting or removing the sulfur from the aqueous admixture. As those skilled in the art will recognize, several of the compounds or compositions are solids at ordinary temperatures, and heat, as necessary, will be provided to convert the solid to liquid for the extraction (and maintain the compound or composition as a liquid, if necessary). In general, compounds or compositions according to the invention which have a melting point of 60° C. or below (preferably 45° C., or below) are preferred. Useful compounds are t-butanol, n-pentanol, n-octanol, n-decanol, n-undecanol, n-dodecanol, and mixtures thereof. The compound or compounds are supplied in an amount sufficient to remove at least the bulk of the sulfur from the admixture and form a separate phase comprising sulfur and the compound or mixture of compounds. Because the amount of the compound, or mixture of compounds, required is dependent on the amount of sulfur produced, which is, in turn dependent on the concentration of $H_2S$ in the gas stream treated, precise amounts of the compounds cannot be given. Those skilled in the art may adjust the amount, as required. In general, the amount will range from about 1.0 percent to about 200 percent (by volume, based on the volume of the polyvalent metal or polyvalent metal chelate solution), with an amount of 5.0 percent to about 120 percent by volume being preferred. The solid sulfur apparently is suspended preferentially in the compound, or mixture of compounds, and may be recovered easily. The manner of recovering the sulfur is a matter of choice. For example, after separating the suspension (or a portion thereof), the sulfur may be recovered by settling, filtration, or by suitable devices such as a hydroclone. Preferably, however, the sulfur is melted, allowing separation by the simple expedient of allowing the sulfur to settle.

In order to illustrate the invention in greater detail, reference is made to the accompanying drawing.

The values given herein relating to temperatures, pressures, compositions, etc., should be considered merely exemplary or calculated and not as delimiting the invention.

As shown, sour gas, e.g., natural gas containing about 0.5 percent H$_2$S, in line 1 enters contactor or column 2 (tray type) into which also enters an aqueous admixture comprising an aqueous 2.0 M solution of the Fe(III) chelate of nitrilotriacetic acid. The pressure of the feed gas is about 1200 p.s.i.g., and the temperature of the aqueous admixture is about 45° C. A contact time of about 120 seconds is employed in order to react all the H$_2$S. Purified or "sweet" gas leaves column 2 through line 3. The "sweet" gas is of a purity sufficient to meet standard requirements. In the admixture, the H$_2$S is converted to elemental sulfur by the Fe(III) chelate, the Fe(III) chelate in the process being converted to the Fe(II) chelate. The aqueous admixture, containing the elemental sulfur, is removed continuously and sent through line 4 to a depressurization and degassing unit 5, and then to a sulfur extraction zone. Prior to entry into unit 6, a stream of liquid n-decanol in line 7 joins line 4 in such a fashion that good mixing of the aqueous admixture and the decanol occurs. The decanol may, of course, be added in unit 6, either wholly or in part, and the ratio of aqueous admixture to the decanol is approximately 1:1.

In unit 6, the decanol and aqueous admixture are allowed to separate into an upper decanol layer or phase, and a lower aqueous admixture layer. Surprisingly, even though sulfur normally has a density greater than 1.0, the sulfur may be said to "float" in the liquid decanol, and is easily separated from the aqueous admixture. Large depths of a sulfur-rich zone in alcohol can be built without sulfur sinking through the aqueous-alcohol phase interface. This considerably facilitates design of the process equipment. Decanol-sulfur mixture is removed from separator 6 via line 8 to a recovery zone or tank 9, where the sulfur may be removed by warming the mixture to the melting point of sulfur. Optionally, only a portion of the upper phase may be removed, a "clarified" portion being separable and recyclable, so that only a portion of the upper phase need be heated. In any event, upon melting, as shown, the sulfur sinks to the bottom of tank 9, where it is easily removed. Decanol is removed via line 7, preferably after cooling, for reuse.

Concomitantly, the aqueous admixture is removed via line 10 for regeneration of the Fe(II) chelate. In regeneration zone or column 11 the admixture is contacted with excess air in line 12 to convert the Fe(II) chelate to the Fe(III) chelate. The temperature of the regeneration column is about 45° C., and pressure in the column is maintained at about 2 atmospheres. Spent air is removed from column 11 through line 13, while regenerated aqueous admixture is returned via line 14 to contactor 2.

The drawing illustrates the aspect of the invention wherein the extraction is carried out prior to regeneration. Removal of the sulfur after regeneration may be preferred in some instances, and may be accomplished by positioning of the extraction unit "after" the regeneration zone. Thus, regenerated liquid, still containing sulfur, may be passed via line 14 to units analogous or equivalent to units 6, 7, 8 and 9, sulfur recovered, and regenerated sulfur-free solution returned a line analogous to line 10 to contactor 2.

While the invention has been illustrated with particular apparatus, those skilled in the art will appreciate that except where specified, other equivalent or analogous units may be employed. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate and sodium acetate, which may be beneficial.

What is claimed is:

1. A process for the removal of H$_2$S from a sour gaseous stream comprising:
   (a) contacting the sour gaseous stream in a contacting zone with an aqueous reaction solution at a temperature below the melting point of sulfur, the mixture comprising an effective amount of a reactant selected from the group consisting of polyvalent metallic ions and polyvalent metal chelate compounds, and mixtures thereof, to produce a sweet gas stream and an aqueous admixture containing sulfur and reduced reactant;
   (b) removing aqueous admixture from the contacting zone;
   (c) contacting said aqueous admixture in an extraction zone with a liquid composition selected from compounds having the formula C$_n$H$_{2n+1}$OH, wherein n is a number from 4 through 15, and mixtures thereof, in an amount sufficient to remove at least the bulk of the sulfur from said aqueous admixture and produce a separate liquid layer containing sulfur and said composition, and forming a three phase mass comprising an upper liquid layer comprising solid sulfur and said composition, and a lower layer in contact with said upper layer, said lower layer comprising aqueous admixture;
   (d) separating at least a portion of the upper liquid layer, and recovering sulfur from the portion separated;
   (e) separating aqueous admixture from the lower layer, and regenerating separated aqueous admixture in a regeneration zone to produce an aqueous admixture containing a regenerated reactant;
   (f) returning aqueous admixture from the regeneration zone to the contacting zone.

2. The process of claim 1 wherein at least a portion of the upper liquid layer separated in step (d) is, after sulfur removal, returned to the extraction zone.

3. The process of claim 2 wherein the reactant is the Fe(III) chelate of nitrilotriacetic acid.

4. The process of claim 2 wherein the reactant is the Fe(III) chelate of N-(2-hydroxyethyl)ethylenediamine triacetic acid.

5. A process for the removal of $H_2S$ from a sour gaseous stream comprising:

(a) contacting the sour gaseous stream in a contacting zone with an aqueous reaction solution at a temperature below the melting point of sulfur, the mixture comprising an effective amount of a reactant selected from the group consisting of polyvalent metallic ions and polyvalent metal chelate compounds, and mixtures thereof, to produce a sweet gas stream and an aqueous admixture containing sulfur and reduced reactant;

(b) removing aqueous admixture from the contacting zone, and regenerating the aqueous admixture to produce a regenerated aqueous admixture containing a regenerated reactant and sulfur;

(c) contacting regenerated liquid aqueous admixture in an extraction zone with a liquid composition selected from compound having the formula $C_nH_{2n+1}OH$, wherein n is a whole number from 4 through 15, and mixtures thereof, in an amount sufficient to remove at least the bulk of the sulfur from said regenerated aqueous admixture and produce a separate liquid layer containing sulfur and said composition, and forming a three phase mass comprising an upper liquid layer comprising solid sulfur and said composition, and a lower layer in contact with said upper layer, said lower layer comprising regenerated aqueous admixture;

(d) separated at least a portion of the upper layer, and recovering sulfur from the portion separated;

(e) separating regenerated aqueous admixture from the lower layer, and returning regenerated aqueous admixture from the extraction zone to the contacting zone.

6. The process of claim 5 wherein at least a portion of the upper liquid layer separated in step (d) is, after sulfur removal, returned to the extraction zone.

7. The process of claim 5 wherein the reactant is the Fe(III) chelate of nitrilotriacetic acid.

8. The process of claim 5 wherein the reactant is the Fe(III) chelate of N-(2-hydroxyethyl)ethylenediamine triacetic acid.

9. The process of claim 1 wherein the extracting composition is a compound having the formula $C_nH_{2n+1}OH$, wherein n is a whole number from 10 through 14, and mixtures of such compounds.

10. The process of claim 5 wherein the extracting composition is a compound having the formula $C_nH_{2n+1}OH$, wherein n is a whole number from 10 through 14, and mixtures of such compounds.

11. The process of claim 9 wherein the reactant is the Fe(III) chelate of N-(2-hydroxyethyl)ethylenediamine triacetic acid.

12. The process of claim 10 wherein the reactant is the Fe(III) chelate of nitrilotriacetic acid.

13. The process of any of the preceding claims wherein the sulfur is recovered from the portion separated by melting.

* * * * *